UNITED STATES PATENT OFFICE.

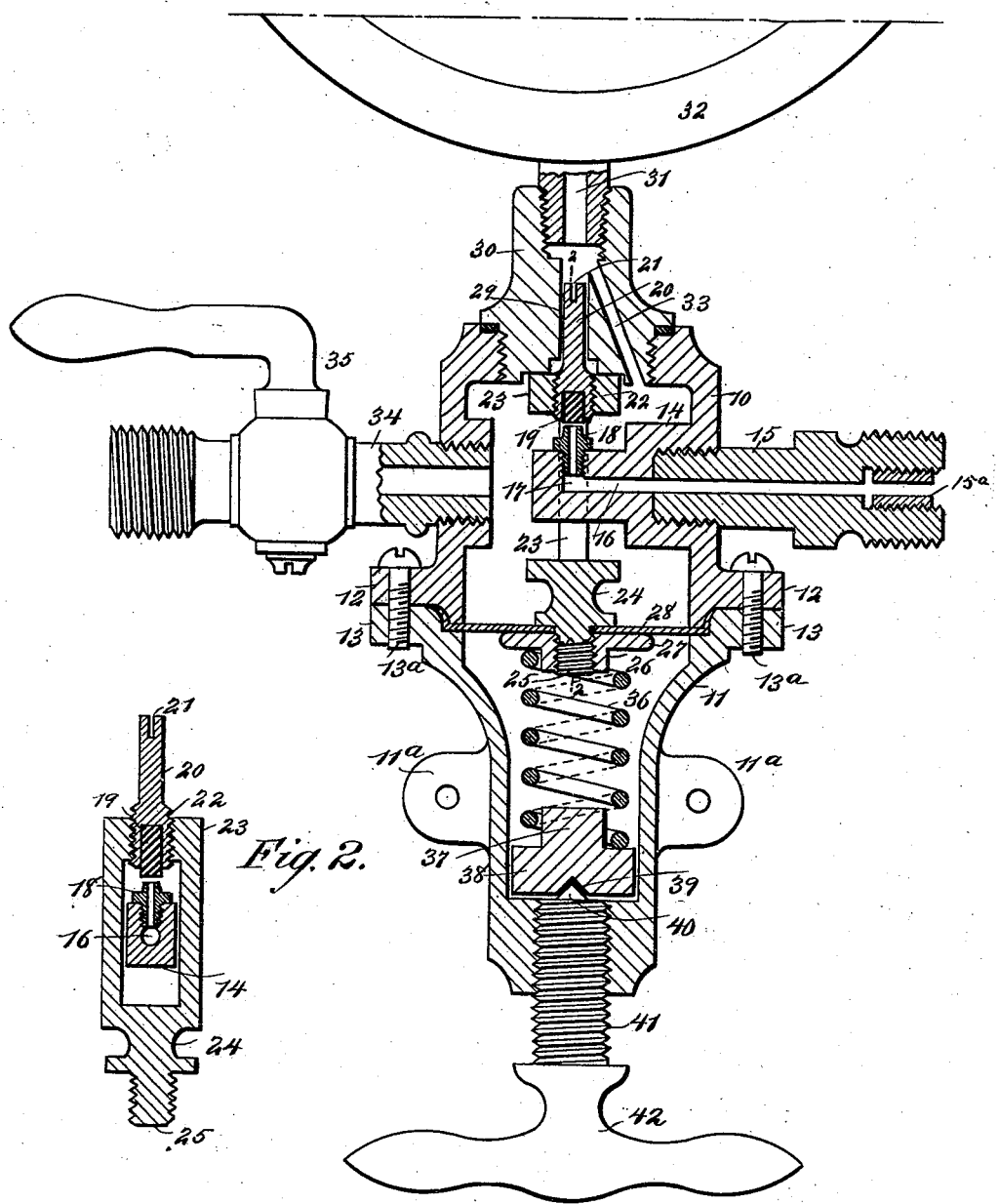

AUGUST HEITHECKER, OF BROOKLYN, NEW YORK.

PRESSURE-REGULATING VALVE.

SPECIFICATION forming part of Letters Patent No. 496,735, dated May 2, 1893.

Application filed November 29, 1892. Serial No. 453,507. (No model.)

*To all whom it may concern:*

Be it known that I, AUGUST HEITHECKER, of Brooklyn, in the county of Kings and State of New York, have invented a new and Improved Pressure-Regulating Valve, of which the following is a full, clear, and exact description.

My invention relates to improvements in pressure regulating valves, and especially to such as are used in reducing and regulating the pressure of gas or other fluids.

The object of my invention is to produce a simple, cheap and substantial valve of this character, which is especially adapted for use in reducing gas from a higher to a lower pressure, and by which the pressure may be reduced and also very nicely regulated.

To these ends my invention consists in certain features of construction and combinations of parts, as will be hereinafter described and claimed.

Reference is to be had to the accompanying drawings forming a part of this specification, in which similar figures of reference indicate corresponding parts in both the views.

Figure 1 is a longitudinal section of the valve embodying my invention; and Fig. 2 is a detail longitudinal section through the inlet, the yoke, and the adjusting screw, on the line 2—2 in Fig. 1.

The valve casing is made up in two separable parts 10 and 11 which have abutting flanges 12 and 13 held together by screws 13ª or their equivalent. The lower portion 11 of the casing is provided with side lugs 11ª which are perforated and which facilitate the attachment of the valve casing to an adjacent support. In the upper portion of the casing and projecting inward from the wall of the casing is a boss 14 which is bored out to receive the inlet nipple 15, and the latter is adapted to connect in the usual way with a source of gas supply. The inner portion of the boss 14 is reduced and provided with a bore 16 which registers with the bore of the nipple 15 and also with a bore 17 extending from the bore 16 at right angles and leading upward through the top of the boss. In the mouth of the nipple 15 is a cylindrical nut 15ª which is intended to fasten a strainer in the nipple so as to strain the gas which passes through the valve.

Screwed into the bore 17 is a nozzle 18 having preferably a reduced upper end, and above the nozzle is held a valve 19 which is held in the lower end of a screw 20 and the latter is arranged vertically above the nozzle 18 and has a slot 21 in its upper end to receive a screw-driver. The screw 20 is enlarged and screw threaded, as shown at 22, and this portion is held to turn in the top of an elongated preferably rectangular yoke 23 which embraces the boss 14 and moves vertically over the boss. The lower end of the yoke terminates in a base 24 which has a screw 25 on the under side and this screw receives a nut 26 which has preferably a flange 27 adapted to offer a wide bearing for the flexible diaphragm 28 which extends transversely across the valve casing, is fastened between the flanges 12 and 13, and is preferably soldered to the lower portion of the casing. The screw 25 extends through the diaphragm and the base 24 fits snugly against the top of the diaphragm, while the flange 27 of the nut 26 fits snugly against the under side of the diaphragm, and it follows that the diaphragm and yoke move in unison. It will be seen therefore that any considerable downward movement of the diaphragm will take with it the yoke and force the valve 19 downward to its seat on the nozzle 18, thus shutting off the steam supply. The body portion of the screw 20 extends upward into the bore 29 of a plug 30 which is screwed into the top of the valve casing, and into the upper part of the plug is screwed the nipple 31 of an ordinary steam pressure gage 32. A port 33 extends diagonally upward through the plug 30 and the gas may pass freely through the port and into the gage. The upper portion of the valve casing is provided with an outlet pipe 34 which is controlled by a cock 35. The diaphragm 28 is backed by a spring 36 which fits around the nut 26 and also around the reduced end 37 of an abutment 38 which is held in the lower end of the valve casing. This spring regulates the valve, and by changing the tension of the spring, the diaphragm 28 may be adjusted so as to yield under a sudden pressure of gas, and when the diaphragm yields the yoke 23 moves down and closes the inlet. When the pressure above the diaphragm is reduced so as to be less than the pressure of the spring 36, the latter pushes up the diaphragm and yoke and opens the inlet. The abutment 38 has a small recess 39 in the under side which receives the conoidal boss 40 of a screw 41, and the latter is threaded into the lower end of the valve casing and is arranged in the same plane as the spring 36, the yoke 23, and the screw 20. The lower end of the screw 41 terminates in a handle 42 by which it may be turned. When the valve is used the screw 20 is first adjusted so as to bring the valve 19 the correct distance from the nozzle 18, and it will be noticed that the construction described enables this to be done without taking the valve apart. To adjust the screw it is only necessary to remove the gage 32, after which a screw-driver may be conveniently applied to the screw 20. After the screw 20 is adjusted, the spring 36 is adjusted by means of the screw 41 so that it shall have the necessary resistance against the diaphragm 28.

The gas enters through the nipple 15 and passes inward through the bores 16 and 17 and the nozzle 18, and filling the chamber above the diaphragm passes outward through the pipe 34. If the pressure gets too heavy in the valve casing it overcomes the resistance of the spring 36, presses downward on the diaphragm 28, pulls down the yoke 23, and forces the valve 19 upon its seat on the nozzle 18, thus temporarily shutting off the steam supply until the pressure is somewhat reduced in the valve casing and the spring 36 again raises the yoke and valve.

It will be noticed that the construction of the valve is very simple, that there is nothing about it to get out of repair, and that by means of the screw 41 and spring 36, the tension of the valve closing diaphragm may be very nicely adjusted.

Having thus described my invention, I claim as new and desire to secure by Letters Patent—

A pressure regulating valve, consisting of the casing 10 11 provided with the inwardly projecting boss 14 having the bore 16 17, the inlet nipple 15 connected with the boss the outlet 34, the plug 30 secured in the casing and having the bore 29 and the diagonal port 33, the screw 20 projecting into the bore of the plug 30, the valve 19 carried by the screw, the diaphragm 28, the yoke 23 in which the screw is mounted to turn having its lower end secured to the diaphragm, the abutment 38 in the lower part of the casing, the screw 40 projecting through the casing and engaging the abutment, and the spring 36 arranged between the abutment and diaphragm, substantially as described.

AUGUST HEITHECKER.

Witnesses:
JAMES A. WARD,
THOMAS DONOHUE.